Jan. 14, 1930.  O. F. SHEPARD  1,743,627
ELEVATOR CONTROL
Filed June 14, 1927

Inventor
Oscar F. Shepard
By Wood & Wood
Attorney

Patented Jan. 14, 1930

1,743,627

UNITED STATES PATENT OFFICE

OSCAR F. SHEPARD, OF CINCINNATI, OHIO

ELEVATOR CONTROL

Application filed June 14, 1927. Serial No. 198,854.

This invention relates to voltage control for elevator motor generator units in the provision of a motor driven exciter separate and independent of the motor generator for exciting the field of the elevator motor and the field of the generator, and supplying the electric energy for the various magnetically operated devices of the elevator controller, resulting in a more uniform and dependable control, greater safety, and the elimination of governor devices.

For convenience and reduction of floor space, the motor driven exciter, being a comparatively small unit, is mounted upon the motor of the motor generator unit so as to offer compactness and stability and to render both units more accessible for repair.

With this separate motor driven exciter, the speed of the exciter is the same under all conditions and not affected by any variation in the load on the main elevator motor or motor generator, and therefore, provides a more uniform control.

The general practice for motor generator units is to employ an exciter connected directly and driven by the armature shaft of the motor of the motor generator unit. Any variation in the speed of the main motor under such condition influences the exciter so that the voltage generated varies with the speed of the main motor which varies with the load changes imposed upon the elevator motor. This variation in voltage varies the regulation so that such regulation cannot be made uniform. Failure of power when the elevator descends with a load causes the main motor to run above synchronism and the exciter voltage rises as the speed increases, holding everything stronger and stronger in running position, and a governor of some sort must be employed for protection, which, however, is not positive nor absolutely dependable so that its use is not satisfactory for elevator service.

In case of power failure on descending of the elevator with a heavy load, the main motor generator would no longer hold back the elevator and there would be a run-way, but with a separate driven exciter, the exciter being fully loaded, drops instantly in speed consequently voltage generated by the exciter drops and everything on control including brake, drops to stop position, and with power off and the brake applied, no damage to the elevator could result.

It is therefore an object of the invention to provide a multivoltage unit for electric motor driven and controlled elevator installations, in which the main service power is an alternating current, with a motor generator unit for supplying the power to a direct current motor driving the elevator, and an exciting unit for elevator motor and generator field excitation, and for supplying a direct current for the various electrically operated control devices, the exciting unit taking power from the same service line supplying the motor of the motor generator unit.

Another object of the invention is to provide an automatically operated controller for independently operating motor generator unit and exciter both taking power from the same feed lines for simultaneous control, and whereby, in starting, an alternating current contactor, as a magnetically operated switch, closes the main power line to the motor and exciter, further utilizing the energy from the exciter in conjunction with a direct current contactor, as a magnetically operated switch, for cutting out the alternating current contactor and motor starting resistance as the exciter builds up, and automatically cutting out the former service connections to both the exciter and motor generator unit in case of power failure.

Other objects and certain advantages will be more fully set forth in the description of the accompanying drawings, forming a part of this specification, in which.

Figure 1:
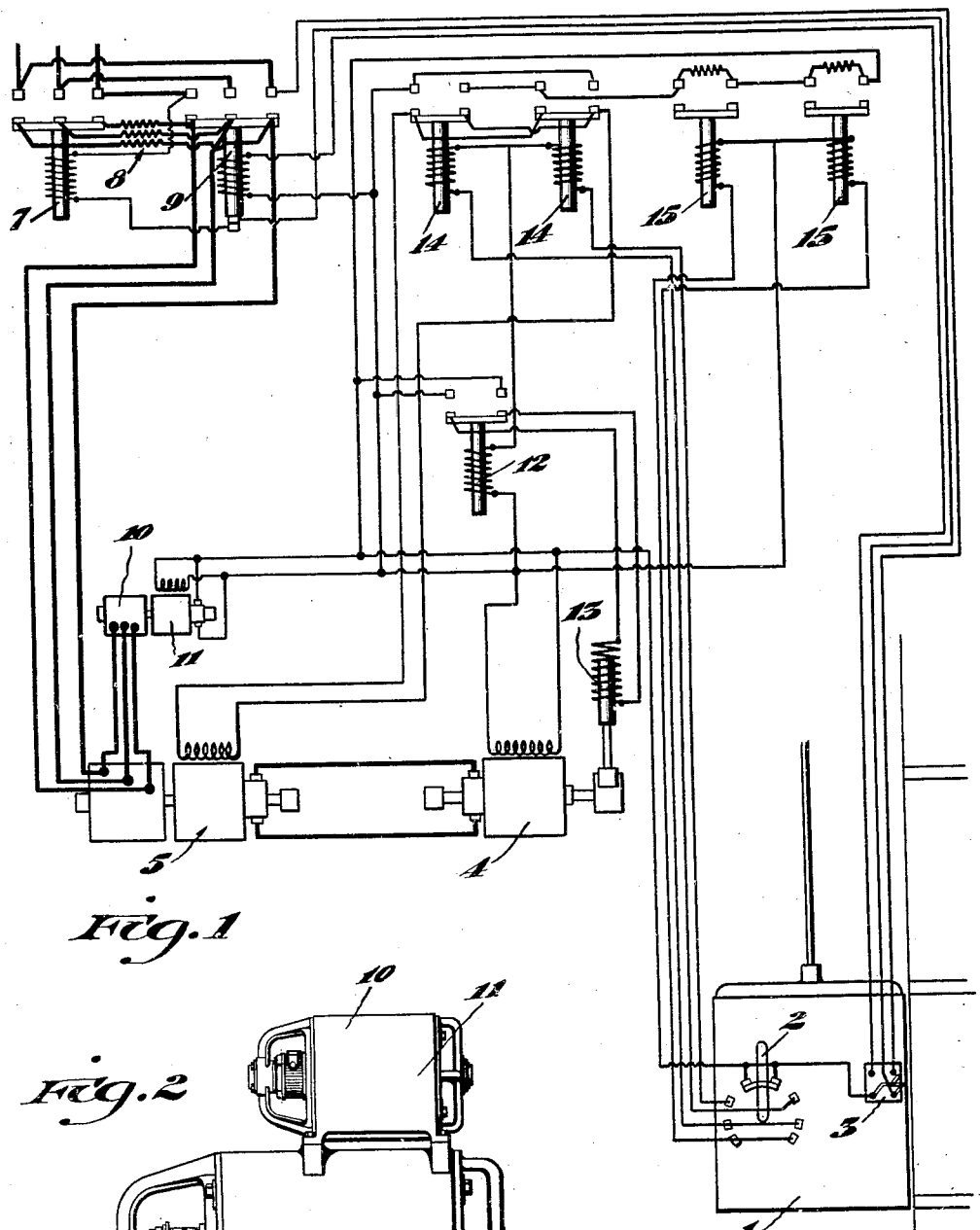
Figure 1 is a diagrammatic view or wiring plan of an electric motor driven elevator installation employing a direct current main elevator motor receiving its electric energy from a motor generator unit and the energy for operating various other electric control devices and field excitation of the main elevator motor and generator from a motor driven exciter.

The motor generator and motor driven exciter and the various devices illustrated in diagram in the drawings as to detail of construction may follow or constitute any type commercially available so that only a general reference thereof need be made herein sufficient to exemplify the present invention.

Likewise, as a system, it may include other devices or modifications, which, however, is immaterial to the aspect of the present invention, it being recognized that supplying energy from an exciter for field excitation of direct current elevator motors and for control service is practiced in the art.

Referring to the drawings, 1 indicates an elevator cab having a manually operated master switch 2 for elevator operation control, as starting and stopping for up and down travel, and a motor generator pilot switch 3 likewise manually operated. 4 indicates a direct current electric motor for driving the elevator and 5 a motor generator unit consisting of an alternating current motor and a direct current generator having a direct shaft connection. The generator furnishing the electric energy for the direct current elevator motor, 10 indicates an alternating current motor in direct driven connection to a direct current exciter 11.

The alternating current motor of the motor generator unit is in electric circuit connection with a controller operated through the motor generator pilot switch in the elevator cab. This controller or motor generator starter consisting of an alternating current contactor 7, alternating current motor starting resistance 8, and direct current contactor 9. Thus, upon closing the pilot switch, an electric circuit is established between the incoming electric service lines and the A. C. contactor 7 closing the switch operated by the A. C. contactor 7, the A. C. contactor 7 including a magnetically operated switch for closing the main line circuits to the alternating current motor of the motor generator unit and at the same time closing the circuit to the alternating current motor 10 in direct driving connection with the direct current exciter 11. The alternating current motor for the exciter as shown is connected with the terminals of the alternating current of the motor generator unit, so that both motors are simultaneously started.

The alternating current motor and its direct driven exciter and the alternating current motor and its direct driven generator thus constitute separate units mechanically independent of each other so that any variation in load imposed upon one which may vary its speed is not transmitted to, nor does it influence the other. Their running condition presents no opportunity for the voltage generated by the exciter to be varied by the speed of the main motor which is subjected to the conditions of load of the elevator motor.

The excitation of both the generator field and the elevator motor field is not varied (except for control purposes) by any change in speed under load conditions or otherwise of the elevator motor. Full excitation of the motor field is had when the elevator motor is slowed up under a load, there being no reduction in the speed of the exciter and reversely upon failure of power when the elevator is descending with load which would tend to run the elevator motor at an increased speed, results in the exciter coming to rest, cutting off the energy for the control devices, including a brake, to withhold the travel of the elevator and thereby bring the elevator motor to rest.

Figure 2:
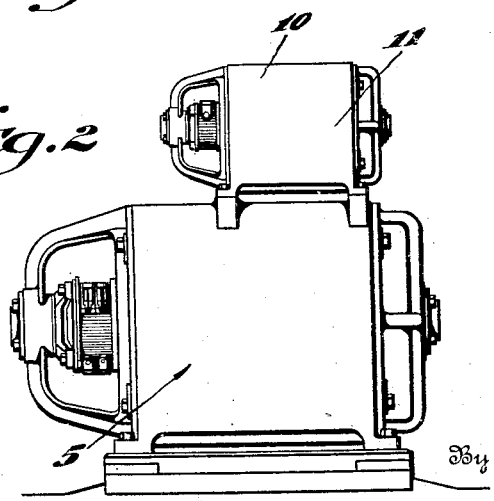
Figure 2 is a side elevation of the motor generator set and motor driven exciter structurally combined.

For commercial advantages, the motor exciter as a unit being of considerable reduced structural dimension than the motor generator unit, is secured directly on the field casing of the motor generator, as shown in Figure 2, with the main circuit wiring of both, coming to common terminals, simplifying the wiring and enabling the same to be wired up at the manufactory, instead of at the place of installation.

Less floor space is required which is always a factor in elevator installations as the elevator operating machinery is usually installed in places where room space is very limited. The difficulties in obtaining shaft alignment and strains on bearings are eliminated over the practice of connecting an exciter directly upon the motor generator shaft. The two units are more accessive for repair and it is not necessary to remove the one from its base to remove the armature shaft of the other. Therefore, both mechanical and electrical advantages result from the use of two separate motor driven units. With a system having the exciter driven by the main motor any preceptible weakening in voltage for the magnetically operated brake, the brake during the operation of the elevator being held out by magnet, may cause the application of the brake, while the elevator is travelling. The brake is applied when the magnet is de-energized and any improper application of the brake while the elevator is pulling a heavy load causes the elevator to jump and adds additional load upon the motor to further slow it up.

Under a reverse condition, as failure of power when the elevator is descending with load, it is essential that the brake be applied and any rise in exciter voltage, as the speed of the elevator increases, would negative the application of the brake at a time most needed. In the present instance, a failure of power brings the exciter to rest and therewith the entire control system so that the brake is immediately applied.

In the arrangement of the system shown, after the motor exciter has been started, it energizes the magnet windings of the direct current contactor 9 closing the main circuit switches, bridging out the starting resistance 8 and opening the circuit to the magnet windings of the alternating current contactor 7, the magnet windings of the direct current contactor being in a circuit connection with the exciter and through the motor generator pilot switch 3 in the elevator cab 1.

Thus, after the exciter builds up, the direct current contactor is operated. This furnishes a time sequence for motor starting before cutting out the starting resistance, and diverts the main line circuit through the direct current contactor, automatically cutting out the alternating current contactor and motor starting resistance. Upon power failure, the direct current contactor cuts out the service connection to both exciter and motor generator unit necessitating a second starting cycle when the power resumes. The reduced voltage direct current contactor is maintained in service during the continued operation of the elevator after starting, and as the exciter supplies the power for all the control devices of the system all are operated on direct current, effecting efficiency in economy and materially simplifying the installation.

The magnet windings of the brake control contactor 12, elevator motor reversing switches 14 for the elevator operating control in up and down travel, and speed control switches 15 are in circuit connection with the master switch 2 in the elevator cab while the brake 13 is in circuit connection with the switch elements of the brake control contactor 12, the magnetically operated control devices all having their windings in circuit connection with the exciter when active or energized, so that the exciter supplies the current for all of the control devices, except the initial energizing of alternating current contactor 7.

As the wiring scheme or system of control is not a part of this invention the wiring from the control devices to the elevator master switch and pilot switch and to the exciter will not herein be individually traced, except the starter.

A motor exciter is herein illustrated as the preferred means of furnishing the control and feed exciting direct current, but it is comprehended that other means may be employed or substituted as a rectifier, the primary feature being in having the exciter independent of the motor generator with both taking power from the same feed lines, and the exciter furnishing the direct current to the control devices and for field excitation after starting.

Having described my invention, I claim:

1. In a multivoltage elevator control and operating unit, a direct current elevator motor for driving an elevator, an alternating current motor and direct current generator unit for supplying the electric energy to said elevator motor, an alternating current motor and direct current exciter unit, and magnetically operated switch devices for circuit control of said motors, generator and exciter, the exciter supplying the field exciting electric energy for said generator and elevator motor and the electric energy for said magnetically operated switch devices after the exciter and generator motors have been started.

2. In a multivoltage elevator control and operating unit, a direct current elevator motor for driving an elevator, an alternating current motor and direct current generator unit for supplying the electric energy to said elevator motor, an alternating current motor and direct current exciter unit, and magnetically operated switch devices for circuit control of said motors, generator and exciter, the exciter supplying the field exciting electric energy for said generator and elevator motor and the electric energy for said magnetically operated switch devices.

3. In a multivoltage unit, a motor generator unit and an exciter, a source of power supply, a starter for the motor generator unit and exciter including a starting resistance, an alternating contactor, a direct current contactor, the alternating current contactor being energized from the source of power supply to connect the motor generator and exciter to the source of power supply through the starting resistance, and a direct current contactor being energized by the exciter and arranged to open the operating circuit of the alternating current contactor and to connect the motor generator unit and exciter directly to the source of power supply.

4. In a motor starting control, an alternating current motor, an alternating current magnetically operated contactor for controlling the power circuit to the motor, an exciter connected in the power circuit to the motor and therewith simultaneously controlled by said alternating current contactor, a second magnetically operated contactor operated by current furnished by said exciter, and motor starting resistance connecting said contactors, said second contactor operated to by-pass the circuit from and cut out said alternating current contactor and starting resistance after starting.

In witness whereof, I hereunto subscribe my name.

OSCAR F. SHEPARD.